United States Patent [19]

Chang et al.

[11] Patent Number: 4,769,779
[45] Date of Patent: Sep. 6, 1988

[54] SYSTOLIC COMPLEX MULTIPLIER

[75] Inventors: Christopher T. Chang, Dallas; Granville E. Ott, Richardson, both of Tex.

[73] Assignee: Texas Instruments Incorporated, Dallas, Tex.

[21] Appl. No.: 809,352

[22] Filed: Dec. 16, 1985

[51] Int. Cl.[4] .................... G06F 7/52; G06F 15/332; G06F 15/347
[52] U.S. Cl. .................................... 364/754; 364/726
[58] Field of Search ...................... 364/754, 760, 726

[56] References Cited

U.S. PATENT DOCUMENTS

| | | | |
|---|---|---|---|
| 3,800,130 | 3/1974 | Martinson et al. | 364/726 |
| 4,228,520 | 10/1980 | Letteney et al. | 364/760 |
| 4,275,452 | 6/1981 | White | 364/726 |
| 4,344,151 | 8/1982 | White | 364/754 |
| 4,546,446 | 10/1985 | Machida | 364/760 |
| 4,597,053 | 6/1986 | Chamberlin | 364/760 |
| 4,680,727 | 7/1987 | White | 364/754 |

Primary Examiner—David H. Malzahn
Attorney, Agent, or Firm—Kenneth C. Hill; Thomas W. Demond; Melvin Sharp

[57] ABSTRACT

A complex multiplier includes a carry-sum systolic array (26) of multiplier cells for processing a multiplicand therethrough in accordance with a modified Booths algorithm. The multiplier performs two multiplications and two addition/substraction operations. A ROM (12) provides the multipliers for the operation which are input to a booth decoder (50) through a delay line (48). The delay line (48) delays pairs of bits by one bit each to synchronize with the flow of the partial products through the array (26). After one product is processed in the array (26), the sum and carry is fed back to the input through a delay (52). This delay allows for processing two products in a single operation with a subsequent operation interleaved therebetween. When one operation is complete, it is output to adders (64) and (66) to perform a complex addition and substraction with another input data vector. This addition occurs at one half the rate of the pipeline (26) due to the interleaving of the two operations.

13 Claims, 5 Drawing Sheets

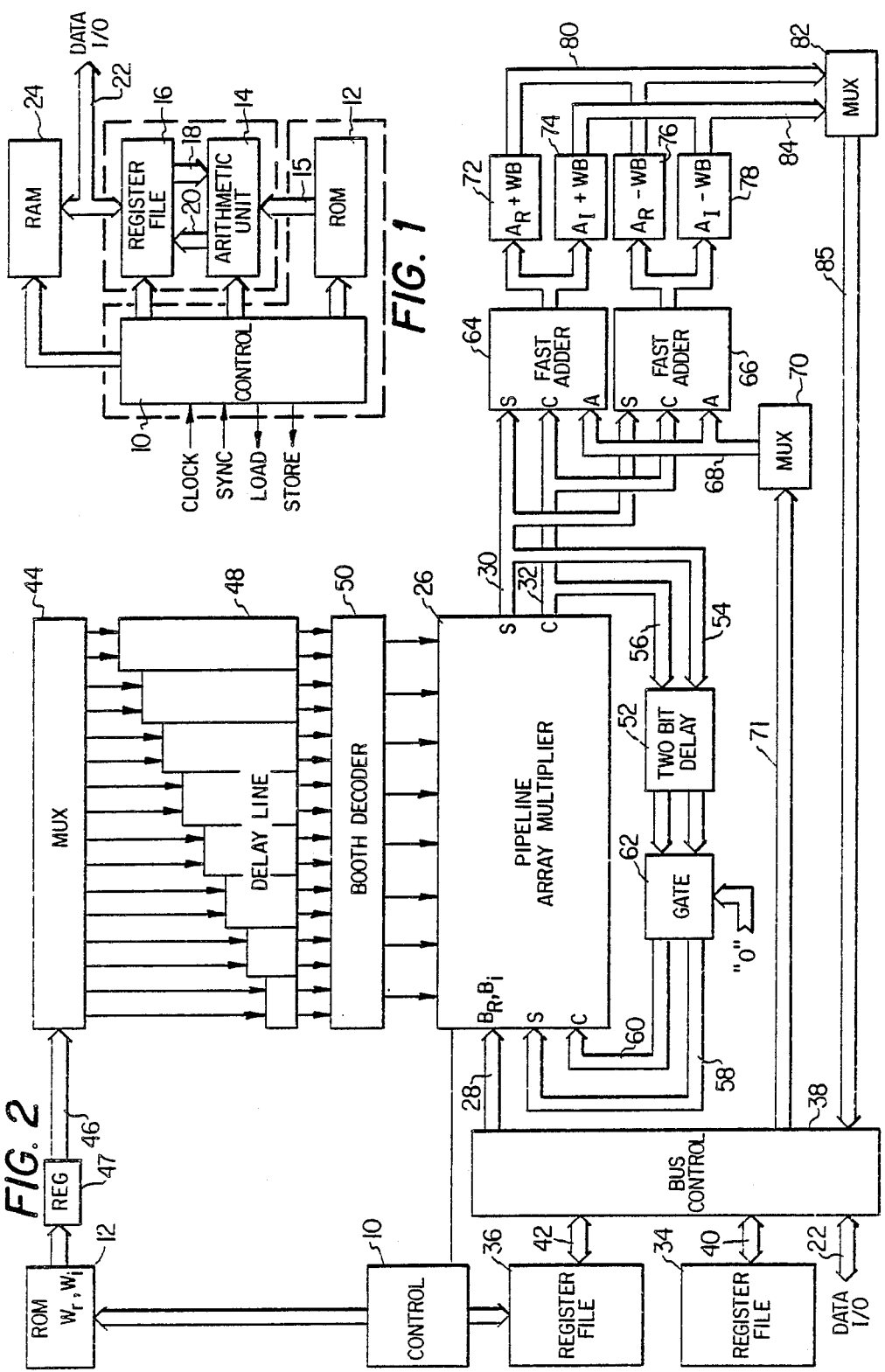

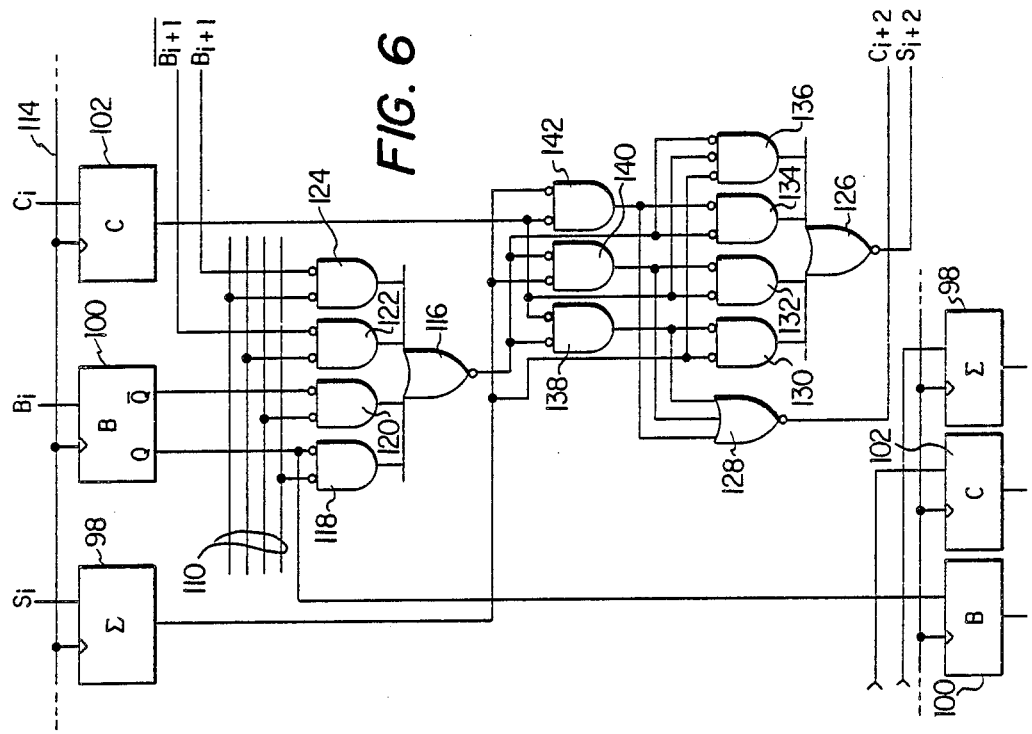
FIG. 6
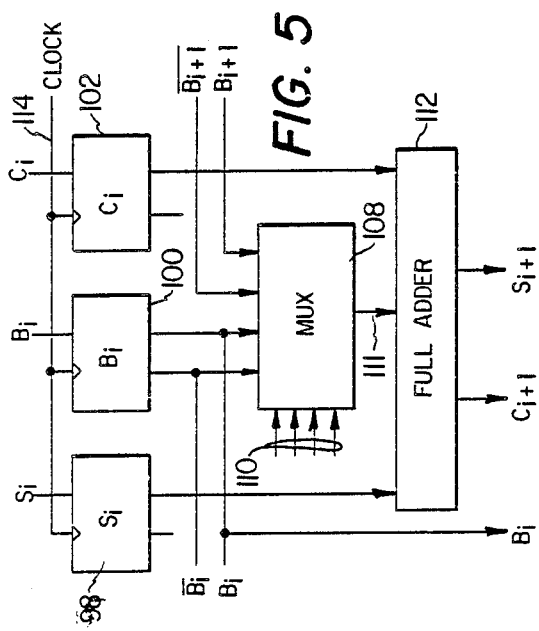
FIG. 5
FIG. 7

SYSTOLIC COMPLEX MULTIPLIER

TECHNICAL FIELD OF THE INVENTION

The present invention pertains in general to multipliers and, more particularly, to a systolic array multiplier for use in generating Fast Fourier Transforms.

BACKGROUND OF THE INVENTION

The computation of a Fast Fourier Transform (FFT) normally requires a significant amount of processing capability. Central to computation of an FFT algorithm is the requirement for vector rotation (multiplication by a unit vector). This vector rotation is typically termed the "butterfly". A Radix-2 FFT butterfly requires a complex multiplication plus a complex addition and subtraction for each pair of values. To perform the complex multiplication further requires four multiplication and two additions. All these operations must be carried out at a relatively high rate of speed while utilizing the computational circuitry to its maximum efficiency.

A wide range of architectures have been provided to implement Digital Fourier Transforms (DFT). Most of these architectures require excessive computation (e.g., chirp-z transform), excessive control circuitry (e.g., Winograd and mixed-prime-Radix algorithms), or excessive gates or I/O pins, (e.g., direct parallel Cooley-Tukey). One efficient architecture that has been employed utilizes a serial pipeline architecture which calculates the butterflies in eleven arithmetic units concurrently. This type of computation reduces the throughput requirements for each of the arithmetic units to permit use of serial arithmetic. However, the total gates-Hz product is excessive due to the pipeline architecture which requires each arithmetic unit to process at full speed half of the time and to remain idle for the other half, thus not continually processing data. The arithmetic unit can be implemented as a systolic array of adder cells with sums and carries being pipelined therethrough so that a multiplication cycle time equals the add time for a single bit cell of the array. This array approach is discussed in R. MacTaggart and M. A. Jack, "A Single Chip Array Radix-2 FFT Butterfly Architecture Using Parallel Data Distributed Arithmetic," IEEE J. Solid State Circuits SC-19, 368 (1984).

Some of the disadvantages of the pipeline structure are the amount of idle time in the pipeline when performing some of the operations. The circuitry utilized to realize the pipeline is normally faster than the circuitry utilized to realize various peripheral adders that are part of the circuitry. Therefore, there still exists some deficiencies in the above pipeline structure.

SUMMARY OF THE INVENTION

The present invention disclosed and claimed herein comprises a Fast Fourier Transform processor for processing butterfly operations. Memories are provided for storing input vectors and Fourier coefficients for performing a complex multiplication to provide a complex product followed by a complex addition with one of the input vectors. The complex multiplication is carried out in a systolic array multiplier which sequentially generates products for the real and imaginary parts of the coefficient with real and imaginary parts of one of the input vectors. These products are sequentially generated and output in a predetermined manner with a one bit delay disposed therebetween. The products utilizing the real part of the coefficient are first generated in a first pass through the multiplier and then fed back to the input of the multiplier for addition with the products utilizing the imaginary part of the coefficient. Interlaced with the operation on the second pass is the step necessary for forming the products in the first pass of a subsequent operation. On the second pass, the real and imaginary parts of the complex parts are input to fast adders and spaced apart by one clock cycle of the multiplier. The fast adders perform an addition and subtraction operation with real and imaginary parts of another input vector in memory. The fast adder operates at one-half the speed of the multiplier. The interlacing of subsequent operations with present operations allows the continuous data flow through the multiplier.

BRIEF DESCRIPTION OF THE DRAWINGS

For a more complete understanding of the present invention and the advantages thereof, reference is now made to the following description taken in conjunction with the accompanying, Drawings in which:

FIG. 1 illustrates a block diagram of the FFT processor showing the arithmetic unit and the control section;

FIG. 2 illustrates a block diagram of the arithmetic unit and the buffered file registers;

FIG. 5 illustrates a schematic block diagram of one cell of the array;

FIG. 6 illustrates a schematic of the array cell of FIG. 5;

FIG. 7 illustrates a memory layout for the buffered file registers;

DETAILED DESCRIPTION OF THE INVENTION

Figure 3:
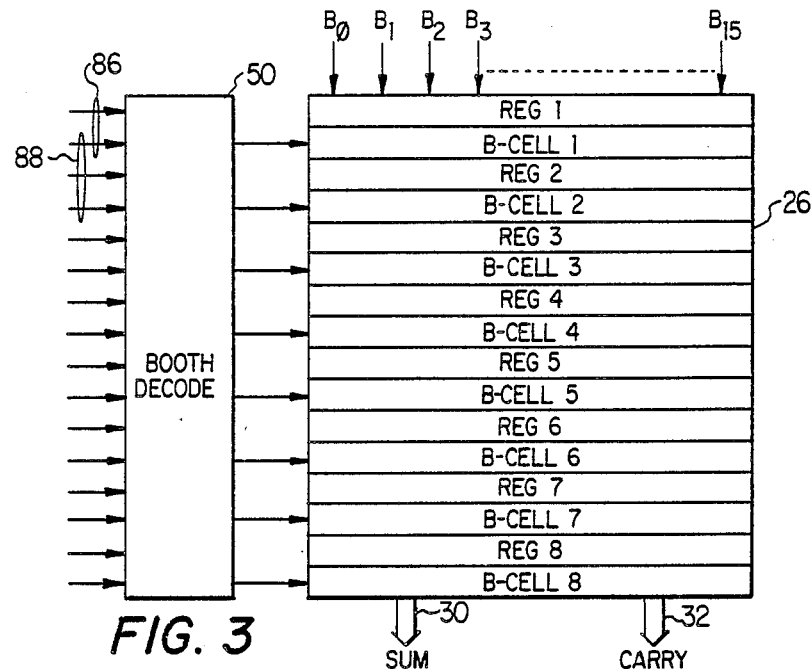
FIG. 3 illustrates a schematic diagram of the pipeline array.

Computation of an FFT algorithm requires a vector rotation (multiplication by a unit vector). A single rotational computation is termed a "butterfly" which is as follows:

$$W_R B_R - W_I B_I = Z_R \quad (1)$$

$$W_I B_R + W_R B_I = Z_I \quad (2)$$

where B is in the input data vector, Z is the output data vector and W is a unit vector termed a "twiddle factor" or an FFT coefficient. As can be seen from equations 1 and 2, direct implementation of vector rotation for the FFT butterfly involves a complex multiplication with four multiplications plus an addition and a subtraction resulting in a complex product $Z_R$, $Z_I$. Further, computation of the Radix-2 FFT butterfly requires a further two additions and two subtractions of the complex product Z with an input data vector A.

$$A_R \pm Z_R \quad (3)$$

$$A_I \pm Z_I \quad (4)$$

With reference to equations 1 and 2, it can be seen that the real component $W_R$ and imaginary component $W_I$ are utilized for calculation of both $Z_R$ and $Z_I$. Before inputting this data into equations three and four, two multiplications must be performed utilizing a single one of the coefficients $W_R$ or $W_I$ or, alternatively, the components $B_R$ or $B_I$. Since for each calculation, the components of the vector must be accessed from memory, the calculations are pipelined as will be described hereinbelow, such that only a single access is necessary to utilize $W_R$ in the pipeline for calculating both $Z_R$ and $Z_I$.

Referring now to FIG. 1, there is illustrated a schematic block diagram of a digital processor for performing the FFT operation. A control circuit 10 is provided that generates control signals for the systolic processor. The FFT coefficients $W_R$ and $W_I$ are stored in a ROM 12 for output to an arithmetic unit 14 on a bus 15. The arithmetic unit 14 is in the form of a systolic array of adder cells, as will be described hereinbelow. A register file 16 is provided to buffer data which has the input vectors A and B loaded therein for input to the arithmetic unit 14 on a bus 18. The results of the arithmetic unit 14 are output to the register file 16 on a bus 20 for storage therein. The register file 16 interfaces with a data I/O bus 22 for receiving data into the register file 16 and also for outputting data therefrom.

The data I/O bus 22 is also interfaced with a RAM 24 which contains data to be processed. This data is transferred from the RAM 24 to the register file 16 for processing and the results output from the register file to the data I/O bus 22 for output from the processor.

Referring now to FIG. 2, there is illustrated a schematic block diagram of the array processor of FIG. 1 with the arithmetic unit 14 illustrated in detail. At the heart of the arithmetic unit 14 is a pipeline array multiplier 26 which utilizes a modified Booths algorithm to perform a multiplication. The array multiplier is a carry-save systolic multiplier. The input vector components $B_R$ and $B_I$ are multiplexed as the multiplicand on a bus 28. The other inputs to the array multiplier 26 are the Booth operators generated from the multipliers $W_R$ or $W_I$. A sum output is provided on a bus 30 and carry output is provided on a bus 32.

The values $B_R$ and $B_I$ are stored in a register file 34 and, alternatively, in a register file 36. A bus control circuit 38 is interfaced with the register file 34 and 36 through buses 40 and 42, respectively, and is operable to alternate between register files 34 and 36, depending upon which register file has the B-vectors stored therein. The bus control circuit 38 is connected to the bus 28 for input to the array multiplier 26.

The coefficients $W_R$ and $W_I$ are stored in the ROM 12 and are temporarily stored in a register 47. The register 47 is interfaced with a multiplexer 44 through a bus 46. The components $W_R$ and $W_I$ are each sixteen bits wide with both components being simultaneously output on the bus 46 which is thirty-two bits wide and stored in register 47. The multiplexer 44 has an output which is sixteen bits wide and is operable to select between the component $W_R$ and $W_I$ that are on the bus 46 for output therefrom.

The output of multiplexer 44 is input to a delay line 48 that provides a one bit delay for the least two significant bits, one bit of delay for the next two bits with additional one bit delays for each subsequent pair of bits, with the two most significant bits having a total of eight bits of delay. Therefore, there are sixteen delay lines provided in the delay line 48.

The output of the delay line 48 is input to a Booth decoder 50 which examines three bits in accordance with the modified Booths algorithm to generate Booth operators. For each two bits of the multiplier, there is one Booths operator generated, such that for a sixteen bit word, eight Booth operators are generated. This is a conventional algorithm which is described in Lewis P. Rubinfield, "A Proof of The Modified Booth's Algorithm For Multiplication", IEEE Transactions on Computers, October 1975, pp. 1014–1015. Additionally, a description of a modified Booth multiplier can be found in U.S. Pat. No. 4,700,323, filed Aug. 31, 1984 and assigned to Texas Instruments Incorporated.

The array multiplier 26 is operable to first calculate the values of products $W_R B_R$ and $W_R B_I$ and output the sum and carry therefor on buses 30 and 32. This is considered the "first pass" through the array multiplier 26. The sum "S" on bus 30 is then input to a two bit delay 52 on a bus 54 and the carry "C" therefor is input to the two bit delay 52 through a bus 56. The delayed sum and carry are input to the sum and carry input of the array multiplier 26 through buses 58 and 60, respectively. A gate 62 is provided for inputting a sixteen-bit wide zero value word to the sum and carry inputs of array 26 when the operation is initialized, as will be described hereinbelow.

When the sum and carry are fed back to the input of array multiplier 26 after the first pass, the value of $W_I$ is input to multiplexer 44 and the multiplicands $B_I$ and $B_R$ again pass through the array multiplier for a "second pass". This results in the output of the value for the complex product components $Z_R$ and $Z_I$ with $Z_R$ output first and $Z_I$ following and delayed by one bit.

On this second pass, the value of $W_I B_I$ is subtracted from the sum and carry value for $W_R B_R$ which was fed back from the first pass. This subtraction operation is accomplished by changing the sign of the multiplier or the multiplicand. This is facilitated by conventional circuitry (not shown).

The sum and carry outputs of the array multiplier 26 on buses 30 and 32, respectively, are input to a fast adder 64 configured for an addition operation and a fast adder 66 configured for a subtraction operation. The input of the fast adders 64 and 66 are connected to a bus 68 which receives the real and imaginary parts of the A-input vector from a multiplexer 70. The fast adders 64 and 66 have the inputs thereof latched such that data is only input every other clock cycle of the multiplier clock. The input of multiplexer 70 is connected to the output of bus control 38 for receiving the components $A_R$ and $A_I$ from register files 34 or 36. The fast adders 64 and 66 have latched inputs and are controlled to only receive inputs every other cycle of the array multiplier 26.

The fast adder 64 has the output thereof connected to the input of a register 72 and also to the input of a register 74 for storing the results thereof. Register 72 stores the addition operation of Equation 3 and register 74 stores the addition operation of Equation 4. In a similar manner, the output of the fast adder 66 is input to both a register 76 and a register 78, with register 76 containing the subtraction operation for Equation 3 and register 78 containing the subtraction operation for Equation 4. The outputs of registers 72 and 76 are combined on a thirty-two bit bus 80 for input to one input of a multiplexer 82. The outputs of registers 74 and 78 are combined onto a thirty-two bit bus 84 for connection to the other input of the multiplexer 82. The output of the multiplexer 82 is connected to the input of register files 34 and 36 through bus control 38. The multiplexer 82 is operable to combine the addition and subtraction operation for Equations 3 or 4 for storage in either the register file 34 or 36 as a thirty-two bit word.

In operation, $V_R$ is first input to fast adder 64 and 66 with the outputs thereof stored in register 72 and 76. The array multiplier 26 is an interleaved structure, as will be described hereinbelow, which allows a one bit delay for the fast adder 64 and 66 to operate. This allows the fast adder 64 and 66 to operate at one-half the rate of the array multiplier 26. In the first calculation of the array multiplier 26, $Z_R$ is generated and input to fast adders 64 and 66 for addition with the input vector A and subtraction therefrom, respectively. After a one bit delay, the results are stored in registers 72 and 76 and the value of $Z_I$ input to fast adders 64 and 66 and the results thereof stored in registers 74 and 78. It is an important aspect of the present invention that the data flow through the array multiplier 26 is constant with no idle time. With the interleaved structure described below, the flow through the array multiplier 26 is twice the processing rate of the fast adders 64 and 66 with no idle time in either one. In addition, the ROM 12 need only be accessed at one-fourth the speed of the array multiplier 26, since both the $W_R$ and $W_I$ value are accessed from each location.

In processing the multiplicands $B_R$ and $B_I$ and the multipliers $W_R$ and $W_I$ through the array multiplier 26, it is necessary to form partial products and add the partial products together. In the preferred embodiment, as described above, the multiplication scheme utilized is a modified Booths algorithm. In this algorithm, it is necessary to analyze the multiplier bits output from the delay line 48 by segmenting the bits into groups of three bits with one bit overlapping in each group and an implied bit to the right of the least significant bit. Therefore, a sixteen-bit multiplier will result in eight three-bit groups. Each group corresponds to a partial product with the sixteen-bit multiplier requiring the generation of eight partial products. In order to generate these partial products, it is first necessary to determine the "modified Booth operator" to determine the operation that must be performed on a given multiplicand in order to generate the respective partial products. The modified booth operators are "0", "+1", "−1", "+2" and "−2". The presence of a "−" requires the generation of the two's compliment of the multiplicand and the presence of a "2" requires shifting of the multiplicand to the left by one bit with a "1" requiring no shift. Therefore, the partial product consists of the multiplicand or its two's compliment shifted to the left by a maximum of one place. A modified booth's operator of "0" results in a partial product having all logic bits therein at a logic "0". In the preferred embodiment, what is utilized is a one's compliment and an initial carry in the input adder.

After generation of a partial product, it is sequentially shifted by two places and added to the preceding partial products. This will require first a generation of the first partial product by the array multiplier 26 and then the subsequent generation of the second partial product and addition with the first partial product. Sequentially, the remaining partial products are generated and added to the intermediate sums.

Referring now to FIG. 3, there is illustrated an expanded schematic representation of the array multiplier 26 and the Booth decode circuit 50. The array multiplier 26 is comprised of eight stages with each stage having a bank of registers (REG1 through REG8) and a bank of Booth adder cells (B-CELL1 through B-CELL8). Each of the banks of Booth adder cells is comprised of sixteen individual Booth multiplexers and associated full adders. The B-value is first stored in the respective register in addition to the respective sum and carry and then added with a subsequent adder which has the Booth operator input thereto to determine the particular operation for generating the respective partial product. This partial product is then output for storage in the subsequent register. The modified Booth operator, as will be described hereinbelow, determines the operation to be performed on the particular bit of the multiplicand ($B_I$ or $B_R$) for a given Booth adder cell.

In an illustrative example of one pass of a multiplier and multiplicand through the array multiplier 26, a sixteen-bit B-value is first stored in REG1 for input to the B-CELL1. The first two bits of the multiplier form a group 86 with one bit implied to determine the Booth operator for B-CELL1. The output of B-CELL1 is then input to REG2 in the second clock cycle of the array multiplier 26 for storage therein. The output of REG 2 is input to B-CELL2 in this second clock cycle. During this second clock cycle, the next two bits of the multiplier are input to the Booth decoder 50. This is combined with the most significant bit of the group 86 to form a group 88. In order to form group 88 this, it is necessary in the Booth decode circuit 50 to have an additional bit of delay for the most significant bit in the previous group to hold this bit over. These three bits are then examined to determine the modified Booth's operator for B-CELL2. The second partial product is then formed and added with the previous partial product and the output stored in REG3 on the third clock cycle. This continues for five more cycles until a carry and sum are output therefrom. Therefore, for each multiplicand placed into the pipeline, a multiplier is input to the delay line 48 such that the three bits necessary for generating the Booth operator for each partial product are present on the input of the Booth decoder 50 at the appropriate time. This allows for continuous generation of the partial products and summation thereof.

In performing the multiplication, the $W_R$ value is input to the delay line 48 and the value of $B_R$ input on bus 28. In the first stage B-CELL1, the first partial product for $W_R B_R$ is formed which is referred to as the partial product over bits "0" and "1". A one bit delay is then provided and $W_I$ input to delay line 48 and $B_R$ input to the array 26. This will initiate the first pass in the "i" cycle. Interleaved therebetween is data from the second pass of the previous cycle or "i−1" cycle.

The flow through the multiplier is illustrated in Tables 1 and 2 and Table 1 illustrating variations of the real and imaginary parts of W with B held constant and Table 2 illustrating the variation of the real and imaginary parts of B with W held constant. The following equalities are made:

$$W_R B_R = RR \tag{5}$$

$$W_R B_I = RI \tag{6}$$

$$W_I B_R = IR \tag{7}$$

$$W_I B_I = II \tag{8}$$

Each of the partial products is generated over the respective bit pairs 0-1, 2-3, ..., 14-15 and summed with the previous intermediate product.

plier and the value of $RR_{R0}$ is calculated in the second stage and output over bits "2" and "3". In clock "2", the real part of the B-input vector $R_0$ and the imaginary part

TABLE 1

| CLK | INPUT W | B | 0 | 1 | 2 | 3 | MULTIPLIER STAGES 4 | 5 | 6 | 7 | $A_1$ | $A_2$ |
|---|---|---|---|---|---|---|---|---|---|---|---|---|
| 0 | $R_0$ | $R_0$ | $RR_0$ | — | — | — | — | — | — | — | — | — |
| 1 | — | — | — | $RR_0$ | — | — | — | — | — | — | — | — |
| 2 | $I_0$ | $R_0$ | $IR_0$ | — | $RR_0$ | — | — | — | — | — | — | — |
| 3 | — | — | — | $IR_0$ | — | $RR_0$ | — | — | — | — | — | — |
| 4 | $R_1$ | $R_1$ | $RR_1$ | — | $IR_0$ | — | $RR_0$ | — | — | — | — | — |
| 5 | — | — | — | $RR_1$ | — | $IR_0$ | — | $RR_0$ | — | — | — | — |
| 6 | $I_1$ | $R_1$ | $IR_1$ | — | $RR_1$ | — | $IR_0$ | — | $RR_0$ | — | — | — |
| 7 | — | — | — | $IR_1$ | — | $RR_1$ | — | $IR_0$ | — | $RR_0$ | — | — |
| 8 | $R_2$ | $R_2$ | $RR_2$ | — | $IR_1$ | — | $RR_1$ | — | $IR_0$ | — | — | — |
| 9 | $I_0$ | $I_0$ | $-II_0$ | $RR_2$ | — | $IR_1$ | — | $RR_1$ | — | $IR_0$ | — | — |
| 10 | $I_2$ | $R_2$ | $IR_2$ | $-II_0$ | $RR_2$ | — | $IR_1$ | — | $RR_1$ | — | — | — |
| 11 | $R_0$ | $I_0$ | $+RI_0$ | $IR_2$ | $-II_0$ | $RR_2$ | — | $IR_1$ | — | $RR_1$ | — | — |
| 12 | $R_3$ | $R_3$ | $RR_3$ | $+RI_0$ | $IR_2$ | $-II_0$ | $RR_2$ | — | $IR_1$ | — | — | — |
| 13 | $I_1$ | $I_1$ | $-II_1$ | . | $+RI_0$ | $IR_2$ | $-II_0$ | $RR_2$ | — | $IR_1$ | — | — |
| 14 | $I_3$ | $R_3$ | $IR_3$ | . | . | $+RI_0$ | $IR_2$ | $-II_0$ | $RR_2$ | — | — | — |
| 15 | $R_1$ | $I_1$ | $+RI_1$ | . | . | . | $+RI_0$ | $IR_2$ | $-II_0$ | $RR_2$ | — | — |
| 16 | $R_4$ | $R_4$ | $RR_4$ | . | . | . | . | $+RI_0$ | $IR_2$ | $-II_0$ | $R_{A0}+$ | $R_{A0}-$ |
| 17 | $I_2$ | $I_2$ | $-II_2$ | . | . | . | . | . | $+RI_0$ | $IR_2$ | — | — |
| 18 | $I_4$ | $R_4$ | $IR_4$ | . | . | . | . | . | . | $+RI_0$ | $I_{A0}+$ | $I_{A0}-$ |
| 19 | $R_2$ | $I_2$ | $+RI_2$ | . | . | . | . | . | . | $RR_3$ | — | — |
| 20 | $R_5$ | $R_5$ | $RR_5$ | . | . | . | . | . | . | $-II_1$ | $R_{A1}+$ | $R_{A1}-$ |
| 21 | $I_3$ | $I_3$ | $-II_3$ | . | . | . | . | . | . | $IR_3$ | — | — |
| 22 | $I_5$ | $R_5$ | $IR_5$ | . | . | . | . | . | . | $+RI_1$ | $I_{A1}+$ | $I_{A1}-$ |
| 23 | $R_3$ | $I_3$ | $+RI_3$ | . | . | . | . | . | . | $RR_4$ | — | — |
| 24 | $R_6$ | $R_6$ | $RR_6$ | . | . | . | . | . | . | $-II_2$ | $R_{A2}+$ | $R_{A2}-$ |

TABLE 2

| CLK | W | B | 0 | 1 | 2 | 3 | 4 | 5 | 6 | 7 | $A_1$ | $A_2$ |
|---|---|---|---|---|---|---|---|---|---|---|---|---|
| 0 | $R_0$ | $R_0$ | $RR_0$ | — | — | — | — | — | — | — | — | — |
| 1 | — | — | — | $RR_0$ | — | — | — | — | — | — | — | — |
| 2 | $R_0$ | $I_0$ | $RI_0$ | — | $RR_0$ | — | — | — | — | — | — | — |
| 3 | — | — | — | . | — | $RR_0$ | — | — | — | — | — | — |
| 4 | $R_1$ | $R_1$ | $RR_1$ | — | . | — | $RR_0$ | — | — | — | — | — |
| 5 | — | — | — | — | — | . | — | $RR_0$ | — | — | — | — |
| 6 | $R_1$ | $I_1$ | $RI_1$ | — | — | — | . | — | $RR_0$ | — | — | — |
| 7 | — | — | — | . | — | — | . | — | — | $RR_0$ | — | — |
| 8 | $R_2$ | $R_2$ | $RR_2$ | . | — | . | — | . | — | — | — | — |
| 9 | $I_0$ | $I_0$ | $-II_0$ | . | — | — | — | . | — | $RI_0$ | — | — |
| 10 | $R_2$ | $I_2$ | $RI_2$ | $-II_0$ | . | — | — | — | . | — | — | — |
| 11 | $I_0$ | $R_0$ | $+IR_0$ | . | $-II_0$ | — | — | . | — | $RR_1$ | — | — |
| 12 | $R_3$ | $R_3$ | $RR_3$ | . | . | $-II_0$ | — | — | . | — | — | — |
| 13 | $I_1$ | $I_1$ | $-II_1$ | . | . | . | $-II_0$ | . | — | $RI_1$ | — | — |
| 14 | $R_3$ | $I_3$ | $RI_3$ | . | . | . | . | $-II_0$ | . | — | — | — |
| 15 | $I_1 \cdot R_1$ | $+IR_1$ | . | . | . | . | . | $-II_0$ | $RR_2$ | — | — | |
| 16 | $R_4$ | $R_4$ | $RR_4$ | . | . | . | . | . | . | $-II_0$ | — | — |
| 17 | $I_2$ | $I_2$ | $-II_2$ | . | . | . | . | . | . | $RI_2$ | $R_{A0}+$ | $R_{A0}-$ |
| 18 | $R_4$ | $I_4$ | $RI_4$ | . | . | . | . | . | . | $+IR_0$ | — | — |
| 19 | $I_2$ | $R_2$ | $+IR_2$ | . | . | . | . | . | . | $RR_3$ | $I_{A0}+$ | $I_{A0}-$ |
| 20 | $R_5$ | $R_5$ | $RR_5$ | . | . | . | . | . | . | $-II_1$ | — | — |
| 21 | $I_3$ | $I_3$ | $-II_3$ | . | . | . | . | . | . | $RI_3$ | $R_{A1}+$ | $R_{A1}-$ |
| 22 | $R_5$ | $I_5$ | $RI_5$ | . | . | . | . | . | . | $+IR_1$ | — | — |
| 23 | $I_3$ | $R_3$ | $+IR_3$ | . | . | . | . | . | . | $RR_4$ | $I_{A1}+$ | $I_{A1}-$ |
| 24 | $R_6$ | $R_6$ | $RR_6$ | . | . | . | . | . | . | $-II_2$ | — | — |

In Table 1, the clock cycles for the array multiplier are illustrated in the left-hand column under the heading "CLK" Clock "0" corresponds to the initial clock when the system is started and the first calculation is performed. This is referred to as "ramping up". In the initial clock "0", the real part of the first value of the W-coefficient is referred to as $R_0$ and the real part for the first B-input data vector is referred to as $R_0$. On the W-input to the delay line 48, the value of $R_0$ is input and on bus 28, the value for $R_0$ is output. This results in the partial product over bits "0" to "1" in the "0" stage of the array multiplier 26 being $RR_0$, the first term refers to the W-value, the second term refers to the B-value and the subscript "0" refers to the first input data vector and associated W-coefficient for the input vectors "0" through "16". In clock 1, no value is input to the multiplier and the value of the W-coefficient $I_0$ is input to the multiplier, resulting in the product $IR_0$ in the first stage of the multiplier 26.

The partial products $RR_0$ are rippled through the multiplier 26 for output on the clock "7". In a similar manner, the product $IR_0$ is output on clock "9", one clock delayed from the product $RR_0$. As described above, the product $RR_0$ corresponds to $W_R$ for the first B-input vector. When $RR_0$ and $IR_0$ are output from the multiplier 26, this constitutes the first pass therethrough. In a similar manner, the first pass for the second B-input vector that was initiated at clocks "4" and "6" is complete in clocks "11" and "13".

In clock "9", the value $RR_0$ is fed back and delayed through the delay circuit 52 to the sum and carry inputs of the multiplier 26. At the same time, the imaginary part of the W-coefficient $I_0$ and the B-input vector $I_0$ for the first B-input vector are then input to the array 26 and rippled therethrough. In this operation, the value $W_I B_I$ is subtracted from the previous product $W_R B_R$. This is represented by a "−" preceding the product $II_0$. This is performed by a simple two's compliment of the multiplicand. The circuitry for performing this two's compliment is not illustrated but conventional circuitry can be utilized for this purpose.

Clock "9" represents the initiation of the interleaving of the second pass with the first pass. For example, the first pass for the third B-input vector $B_2$ has the real part $R_2$ along with the real part of the W-coefficient $R_2$ input in clock "8" and the real part of the B-input vector $R_2$ in the imaginary part of the W-coefficient $R_2$ input on clock "10". Therefore, the value $RR_2$ is rippled through the multiplier 26 for output in clock "15" and the value $-II_0$ is rippled through for output clock 16. The designation of a "−" or a "+" preceding the partial product designates the second pass through the multiplier. Therefore, the second pass is interleaved with the first pass of another operation.

At the end of clock "16", the first complex multiplication utilizing the W-coefficient and multiplicand corresponding to the first B-input vector is output. This corresponds to $Z_R$. In a similar manner, the value for $Z_I$ is output in clock 18. This results from the value of $IR_0$ being "wrapped" back around through the two bit delay 52 and input to the array in clock "13" for summation with $R_0$ for the W-coefficient and $I_0$ for the B-input vector.

When the value $-II_0$ is output, it is added with the real part of the A-input vector and also subtracted therefrom. This is noted by Columns $A_1$ and $A_2$. In Column $A_1$, this value is added in the fast adder 64 to provide the sum, with the subtraction taking place in fast adder 66. The value RA0+ indicates the sum operation for the real part of A for the first B-input vector. In a similar manner, the value RA0− is output indicating the subtraction operation. This value is output in clock "17". In a similar manner, the imaginary summation and subtraction is output in clock "19". It can be seen that the fast adder operates over two clock cycles of the adder, thus allowing the fast adders 64 and 66 to operate at a lower rate.

Once the multiplier 26 has "ramped up" at clock cycle 15, all the stages are full and data is continually being processed therethrough. Only during the initial clock cycles is the multiplier 26 not full.

With further reference to Table 1 and the sequence that the real and imaginary parts of the W-coefficient and B-input vector are input to the multiplier 26, it can be seen that the first value of the B-input vector $B_0$ is accessed and the values of $R_0$ provided for clocks "0" and "2". The imaginary value $I_0$ therefor is not required until clocks "9" and "11". Therefore, these are placed into a register for use in clocks "9" and "11".

In order to provide the appropriate timing, it is necessary for the B-input vectors to have the real part $R_n$ stored in a register and the imaginary part input to a delay circuit to delay it ten clock cycles for storage in a second register. Therefore, the value $R_n$ is held in the register for four clock cycles and in the next value of $R_{n+1}$ loaded into the register for another four clock cycles. A multiplexer (not shown) is provided for selecting between the $R_n$ and the $R_{n-2}$ registers for alternate clock cycles. For example, in clock cycle "8", the value of $R_2$ is output and then the value of $I_0$. For the following clock cycle, $R_2$ is again output and then the value of $I_0$. This allows the B-input vector to be accessed at one-fourth the rate of the clock for the multiplier 26.

The W-coefficient has the real and imaginary parts $R_n$ and $I_n$ for the $W_n$-coefficient output and stored in a register. In addition, the $R_n$ and $I_n$ values are input to a delay circuit which delays these values for eight clock cycles to output the value $R_{n-2}$ and $I_{n-2}$. In operation, a multiplexer is provided for selecting between the value of $R_n$, $I_n$, $R_{n-2}$ and $I_{n-2}$ in accordance with a predetermined pattern. The multiplexer first selects $R_n$, then $I_{n-2}$, then $I_n$ and then $R_{n-2}$. A new value of $R_n$ and $I_n$ is then input to the one register and the value of $R_{n-2}$ and $I_{n-2}$ are provided. Referring further to Table 1, it can be seen between clocks "8" and "11" that the values for $R_2$ and $I_2$ are stored in the one register and the values for $I_0$ and $R_0$ are stored in the delayed register. The values for $R_2$ and $I_2$ are then delayed by eight clock cycles so they can be selected between clocks "16" and "19". Therefore, it is only necessary to output the W-coefficient at one-fourth the clock rate of the multiplier 26.

In Table 2, the only difference is that the sequence that the W-coefficient and the B-input vector are reversed; that is, the real or imaginary parts of the W-coefficient is provided for four clock cycles whereas the corresponding real input part of the B-input vector is alternated during the four clock cycles.

After generation of the results and storage thereof in registers 72–78, the output can be stored in either register file 34 or register file 36. In operation, register files 34 and 36 "flip-flop" between a file for storage of results and a file for storage of data. In processing the data, results are cycled back through the pipeline as input vectors until the final results are obtained. Therefore, in one cycle of the array 26, register 34 may have input data with register 36 having results stored therein. In the next pass, these results become input data with register 34 having results stored therein. The register files 34 and 36 are therefore utilized as temporary storage for the input data which is comprised of the time tables and the processed data which represents frequency samples. They are organized as a 16 (row)×32 (column) array. Only sixteen transforms are required before the two files are "flip-flopped" for each cycle. This allows the multiplier array to operate at a high clock rate while simultaneously allowing the files to load and unload at a slower clock rate.

Figure 4:
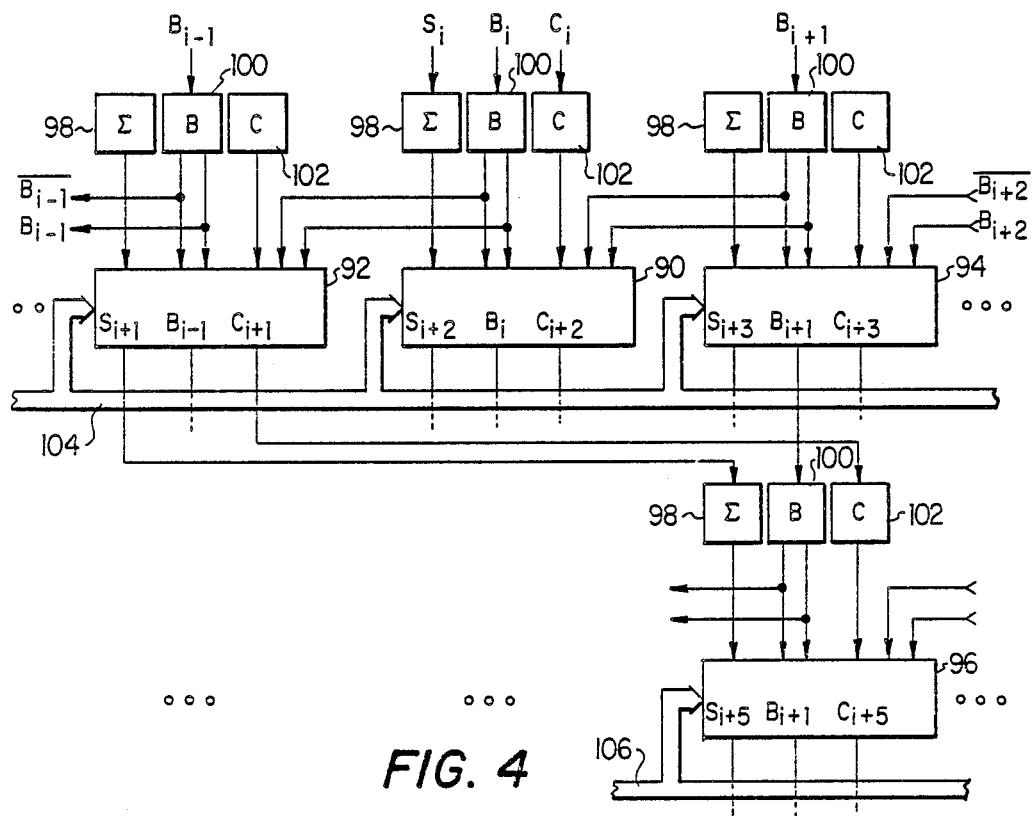
FIG. 4 illustrates a schematic block diagram of two rows of the array cells.

Referring now to FIG. 4, there is illustrated a schematic block diagram of two stages of the pipeline array multiplier 26 illustrating three Booth cells in one row and a single booth cell in an adjacent row. The first row is comprised of a Booth cell 90 for processing the $B_i$ bit, a Booth cell 92 for processing the $B_{i-1}$ bit and a Booth cell 94 for processing the $B_{i+1}$ bit. The second row is illustrated with a Booth cell 96 for processing the $B_{i+1}$ bit. Each of the Booth cells 92–96 has an S-register 98 for storing the input summation results, a B-register 100 for storing the B-vector input data and a C-register 102 for storing the carry input data. The Booth cells 92–96 each have an input for receiving the contents of the S-register 98 and the contents of the C-register 102. In addition, the B-register 100 has output therefrom both the true and the compliment form of the B-vector bit stored therein for input to the respective one of the Booth cells 92-96. Also input to the Booth cells 92-96 are the true and compliment forms of the shifted B-values with for example the value $B_{i+1}$ and the inverted form thereof input to Booth cell 90.

The Booth cells 90-94 in the first row are controlled by a bus line 104 which contains the modified Booth operator generated by the Booth decode circuit 50 that determines the value to be added to the previous sum and carry, as will be described hereinbelow. The Booth cell 96 in the second row is controlled by a modified Booth operator input thereto on a bus 106.

In operation, the value $B_i$ is input to the B-register 100 associated with the Booth cell 90. Modified booth operators select either the value of $B_i$, the compliment thereof, the value of $B_{i+1}$ or the compliment thereof or addition with the carry value $C_i$ and the sum value $S_i$. The Booth cell 90 generates the values for $S_{i+2}$ and $C_{i+2}$ with the value of $B_i$ being passed therethrough. In the second row, the value of $B_{i+1}$ from the Booth cell 94 is input to the B-register 100 associated with the Booth cell 96. However, the sum value from the previous operation represents the previous intermediate sum of partial products is shifted from Booth cell 92 along with the value stored in the C-register 102. For each row, the shift is performed in accordance with the modified Booth's algorithm.

Referring now to FIG. 5, there is illustrated a more detailed schematic block diagram of a single one of the modified Booth cells 92-96 in addition to the S-register 98, the B-register 100 and the C-register 102. The modified Booth cell is comprised of a multiplexer 108 which receives on its input the true and compliment outputs of B-register 100 and also the true and compliment of the $B_{i+1}$ values from the subsequent stage. The multiplexer 108 is controlled by four lines 110 which represent the modified Booth operator. In the preferred embodiment as described above, modified Booth operators are "$-2$", "$-1$", "$0$", "$+1$" and "$+2$". Therefore, a high logic state on any of the lines 110 represents all modified Booth operators with the exception of "0". This state is represented when all lines are at a logic zero. For a logic zero, a value of "0" is output from the multiplexer on an output line 111. For a value of "$+1$", the true value of $B_I$ is passed to the line 111. For a value of "$+2$", the value of $B_{i+1}$ is output. For the value "$-1$" and "$-2$", the inverted form of $B_i$ and $B_{i+1}$ is output.

The output of multiplexer 108 and the output of the sum register 98 and the C-register 102 are input to a full adder 112 which has an A-and B-input connected to the output of the S-register 98 and the line 111, respectively and the carry input connected to the output of the C-register 102. Full adders are more fully described in *The TTL Data Book For Design Engineers,* 2nd edition, Texas Instruments Incorporated, October 1976, pp. 7-54 and U.S. Pat. No. 4,449,197 issued to J. L. Henry on May 15, 1984. The full adder 112 outputs the carry value $C_{i+2}$ and the sum value $S_{i+2}$. In addition, the true value for $B_i$ is also output.

The registers 98-102 are clocked by a single clock signal on a line 114. This clock signal on line 114 is supplied to all of the Booth cells in a given row such that all the bits of the B-input data vector are synchronously clocked through the pipeline.

Referring now to FIG. 6, there is illustrated a schematic diagram for the Booth cells of FIG. 5, wherein like numerals refer to like parts in the various figures. The multiplexer 108 is comprised of a four input NOR gate 116 which has the output of four AND gates 118, 120, 122 and 124 interconnected thereto. Each of the AND gates 118-124 has one input thereof inverted and connected to a separate one of the lines 110. The other input of AND gate 118 is inverted and connected to the true output of the B-register 100 and the other input of the AND gate 120 is connected to the complimentary output thereof. The AND gate 122 has the other input thereof connected to the inverted form of $B_{i+1}$ and the other input of AND gate 124 is inverted and connected to the $B_i + 1$.

The full adder 112 is formed of a four input NOR gate 126 for outputting the sum value $S_{i+2}$ and a three input NOR gate 128 for outputting the carry value $C_{i+2}$. The four inputs of the NOR gate 126 are each connected to the output of one of four AND gates 130, 132, 134 and 136, respectively. The AND gates 130-136 all have inverted inputs therefore. One input of AND gate 130 is connected to the output of S-register 98 and the other input thereof connected to the output of an AND gate 138 with inverting inputs therefore. One input of AND gate 132 is connected to the output the C-register 102 with the other input thereof connected to an AND gate 140 with inverting inputs therefore. One input of AND gate 134 is connected to the output of NOR gate 116 with the other input thereof connected to the output of an AND gate 142 with inverting inputs therefor. The AND gate 136 has three inputs, one of which is connected to the output of S-register 98, one of which is connected to the output of C-register 102 and the other of which is connected to the output of NOR gate 116. The NOR gate 128 has the three inputs thereof connected to the outputs of AND gates 138-142, respectively.

Referring now to FIG. 7, there is illustrated the layout of the register files 34 and 36 of FIG. 2 which are referred to as Buffer A and Buffer B which are each thirty-two bits wide by thirty-two words deep. The ROM 12 is represented by a W-file and is thirty-two bits wide and sixteen words deep with the first sixteen bits of each word being the real value and the second sixteen bits being the imaginary value. The W-coefficients are the Fourier coefficients utilized for each transform of the data input thereto. In the preferred embodiment, there are sixteen data points provided which for a Radix-2 FFT requires the data to be processed four times which is the algorithm to the base two of the number of data points. If there were 1028 data points, this would require ten passes through the arithmetic unit and would requires 1028 W-coefficients.

Buffer A is arranged in two parts, a top portion and a bottom portion. The top sixteen locations each have a thirty-two bit data word representing the real and imaginary part of the A-input vector. The bottom portion has sixteen locations each having a thirty-two bit word representing the real and imaginary part of the B-input vector. Buffer B is loaded with the results of which there are sixty four. These are arranged such that the first location contains the result $A_R + Z_R$ in the first sixteen bits of the thirty-two bit word and $A_R - Z_R$ for the second sixteen bits of the thirty-two bit data word. In the second location, the results using $A_i$ and $Z_i$ is stored. The first two locations in Buffer B corresponding to the first location and the top portion of buffer A and the first location in the bottom portion of Buffer A form the A- and B-input vectors for the next cycle.

In operation, Buffer A is first loaded with the A-and B-input vectors in the top and bottom portions. In the first cycle through the arithmetic unit, Buffer A data is processed and the results stored in Buffer B. Then the results in Buffer B become the A-and B-input vectors and they are processed and the results stored in Buffer A. Two more cycles are required for sixteen data points as the information in Buffer A is again processed as input data vectors and stored in Buffer B and then the results in Buffer B processed as input data vectors and the results stored in Buffer A. At this point, the results of Buffer A are output to the I/O bus 22 and new data stored in Buffer B. It is not important whether data is initially stored in Buffer A or Buffer B but, rather, that the operation is initiated at the first buffer to have new data stored therein.

Figure 8:
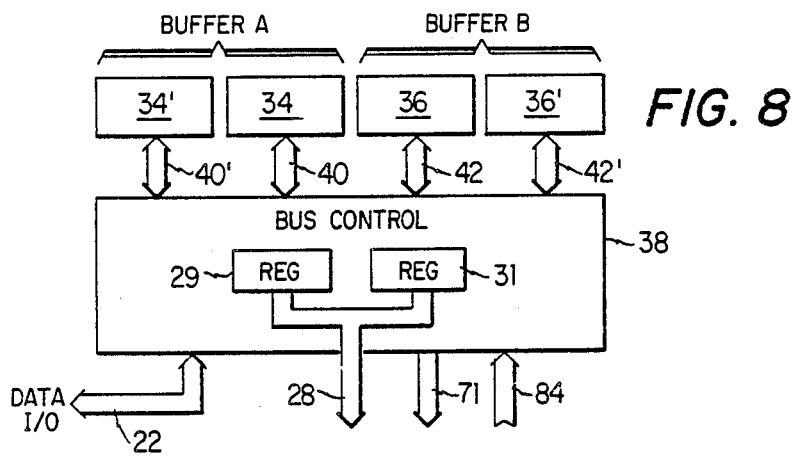
FIG. 8 illustrates a block diagram of the buffered file registers.

Referring now to FIG. 8, there is illustrated an expanded block diagram of the register files 34 and 36 and bus control circuit 38 of FIG. 2. An additional buffer 34' is added to Buffer A and an additional buffer 36' is added to Buffer B. In operation, data is initially loaded into Buffer A at register file 34 and results are stored in register file 36 in Buffer B. As described above with reference to FIG. 7, these two buffers are flip-flopped for four cycles until all data has been processed for the FFT over the data points initially stored in register file 34. However, to prepare for the next set of data points to be transformed, the register file 34' is provided for initially storing the results. In the next processing cycle, register file 34' holds input data and register file 36' is operable to store results therein and then to process data back and forth between register files 34' and 36'. While register files 34' and 36' are utilized in this processing mode, the data stored in either register file 34 or register file 36 can be output and new data input to the other of the two files without interrupting data processing flow. In the preferred embodiment, register files 34, 34', 36 and 36' are one memory that is memory mapped. Basically, it is only necessary to manipulate the addresses and to provide external registers or latches for holding the information after addressing thereof. Memory mapping of this single memory requires only alteration of a single bit in the address to access a different location in the memory.

To provide storage for subsequent operations, the bus control circuit 38 contains two multiplexed registers 29 and 31. One of the registers provides a delay of imaginary part of the B-input vector by two clock cycles in accordance with the embodiment of Table 1 to provide $R_n$ and $I_{n-2}$ for the mutiplicand. Alternately, one of the registers delays the real and imaginary parts of the B-input vector by two clock cycles to provide $R_{n-2}$ and $I_{n-2}$ with the other register providing $R_n$ and $I_n$ in accordance with the embodiment of Table 2.

Figure 9:
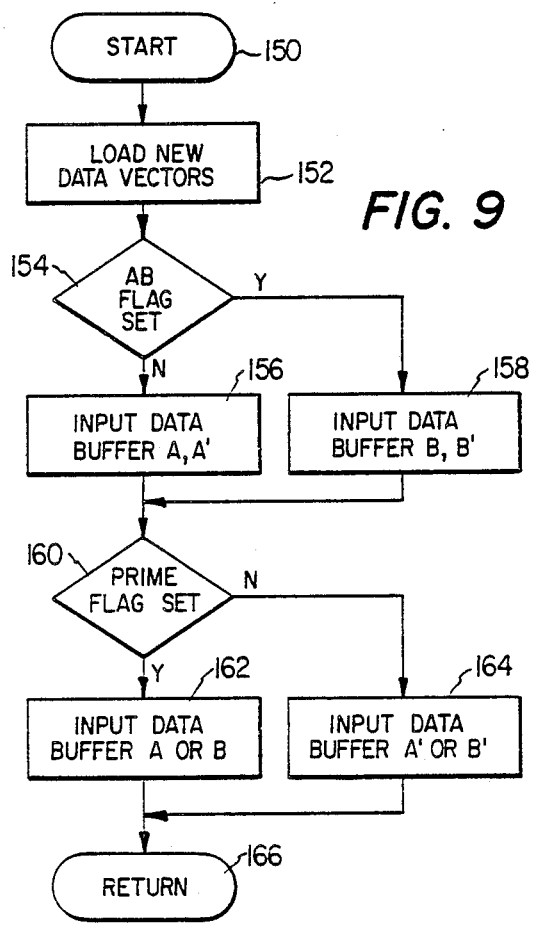
FIG. 9 illustrates a flow chart for loading the file registers with new data.

Referring now to FIG. 9, there is illustrated a flow chart for loading new data vectors into the processor from the RAM 24 of FIG. 1 wherein buffers are defined as Buffers A and A' corresponding to register files 34 and 34', respectively and Buffers B and B' corresponding to register files 36 and 36'. The program is initiated at a start block 150 and proceeds to a function block 152 to load new data vectors. This initiates an operation wherein data is accessed from the RAM 24 and input to the register file 16. The program then flows to a block 154 to determine if the AB flag is set. This flag determines whether the A Buffer is the input file or the B Buffer is the input file. Depending upon the state of the flag, the program then flows to a function block 156 or 158 to define Buffers A and A' or B and B' as the input buffers. The program then flows to a decision block 160 to determine if the prime flag is set. The prime flag determines whether the particular one of the register files in either Buffer A or Buffer B is designated for receiving data from the RAM 24. Depending upon the state of the prime flag, the program then flows to a function block 162 to designate Buffer A or Buffer B as input data buffer or flow to a function block 164 to designate Buffer A' or Buffer B'. Function blocks 162 and 164 depend upon the setting of the AB flag. The program then flows to a return block 166 to return to the main program. Therefore, when new data is to be loaded, the setting of the AB flag and the prime flag determines which of Buffers A, A', B or B' are designated as the input data buffer. The program for unloading results utilizes a similar scheme as that of the flow chart in FIG. 9 to determine which of the register files contain output data to be unloaded. During loading and unloading of data, the processor continues to process data with the undesignated register files.

Figure 10:
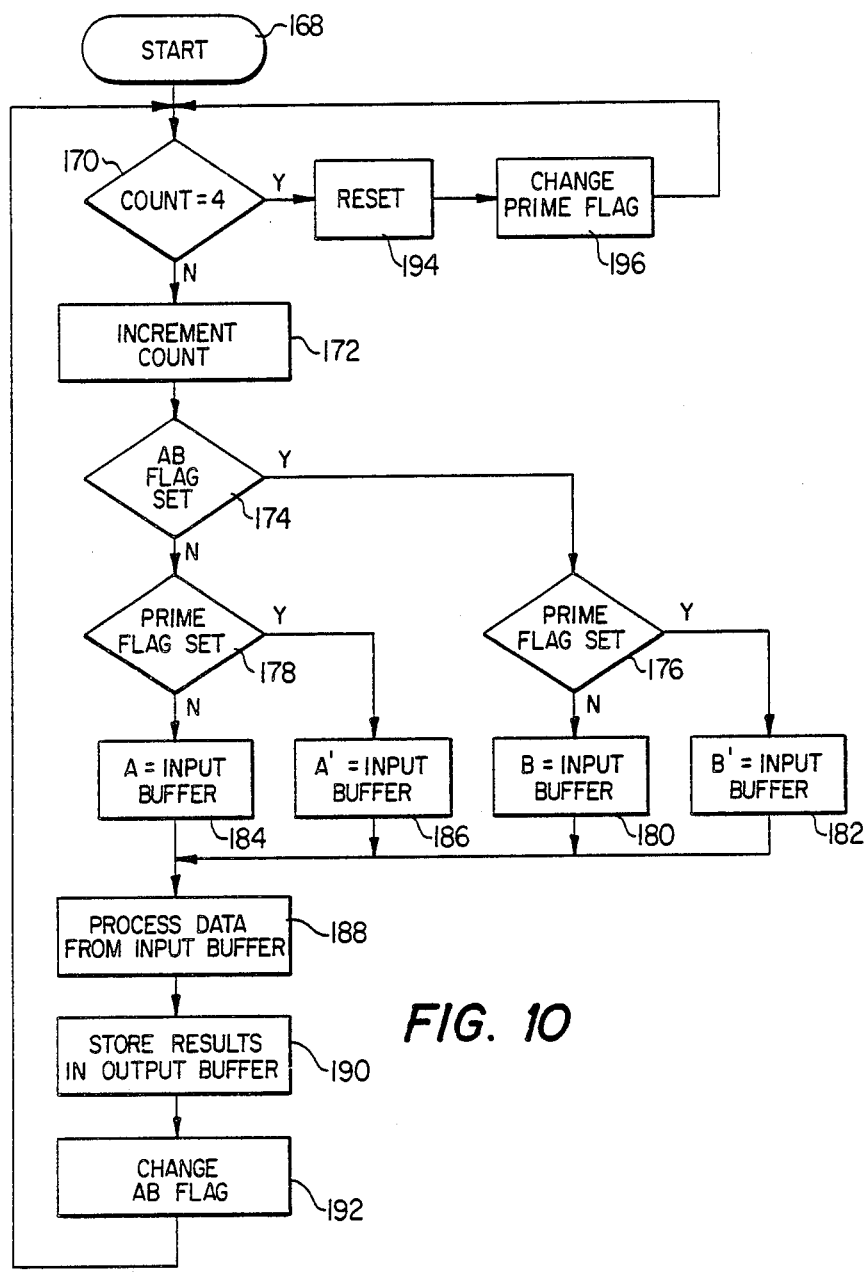
FIG. 10 illustrates a flow chart for cycling through a transform with one set of data.

Referring now to FIG. 10, there is illustrated a flow chart for processing data in the array processor after loading into the register file 16. The program is initiated at a start block 168 and then flows to a decision block 170 to determine if an internal counter has a value stored therein equal to four counts. In this embodiment, a Radix-2 FFT is utilized with sixteen data points. If a counter is not set equal to four, the program flows to a function block 172 to increment the count and then to a decision block 174 to determine if the AB flag is set. If set, the program flows to a decision block 176 or, if not set, the program flows to a decision block 178, decision blocks 176 and 178 determining if the prime flag has been set. The state of the prime flag in decision block 178 sets the program to either a function block 180 to designate the Buffer B as the processing input buffer or to a function block 182 to designate Buffer B' as the processing input buffer. The state of the prime flag in the decision block 178 causes the program to flow to either a function block 184 to designate Buffer A as the processing input buffer or to a function block 186 to designate Buffer A' as the processing input buffer. After determining the processing input buffer, the program flows to a function block 188 to process data from the this buffer through the pipeline and then store the results in the processing output buffer, as indicated by function block 190.

After the results have been stored in the output buffer, the program flows to a function block 192 to change the stage of the AB flag. For example, if Buffer A is defined as the processing input buffer for one cycle, it is then necessary to define Buffer B as the processing input buffer for the next cycle and, concurrently, Buffer A is the processing output buffer for the next cycle. The program will then flow back to the input of decision block 170 to again process the sixteen points of data through the pipeline. Since the state of the prime flag has not been changed, the prime buffers will still be designated as either receiving new data from the external RAM 24 or outputting results thereto.

After four passes, the program flows from decision block 170 to a function block 194 to perform a write or reset function that effectively indicates to the RAM that the sixteen points of data have been processed through the FFT algorithm. The program then flows to a function block 196 to change the prime flag and then returns back to the input of function block 170. This now designates the Buffers A' and B' as the processing input and output buffers and allows data to be unloaded from the Buffers A or B which have the results contained therein and load new data in the other of the two buffers. This operation can occur at a much slow rate than that for processing data.

In summary, there has been provided a processor that utilizes a systolic array multiplier. The multiplier is comprised of a systolic array which processes a multiplicand through an array of adders in accordance with a modified Booth's algorithm. The flow through the pipeline is interleaved such that one portion of a multiplication operation for a complex number is being sequenced through the pipeline followed by a multiplication of a prior calculation. Two passes through the pipeline are required such that the final result output therefrom can be input to a full adder for addition with another term. The full adder is allowed to operate at one-half the speed of the systolic array due to the interleaving of data with output results occurring every other cycle of the systolic array. In addition, the multiplier need only be accessed at one half the rate of data flow through the systolic array.

In another embodiment of the present invention, the input data vectors for the FFT operation are input to a first buffer with the output results of each cycle of the processor stored in an identical buffer. During processing, the results are processed back through the arithmetic unit as input vectors and results stored in the other buffer such that the buffers I/O function is flip-flopped. Additional buffers are provided for buffering input data from an external memory and buffering output results for interface with the external memory. When a given set of points is processed through the FFT arithmetic unit, the buffer containing the result is designated as an output buffer and the buffer having the new data contained therein is designated as the input data buffer such that data processing in the unit is not interrupted for input and output of results to and from an external memory device.

Although the preferred embodiment has been described in detail, it should be understood that various changes, substitutions and alterations can be made therein without departing from the spirit and scope of the invention as defined by the appended claims.

What is claimed is:

1. A complex multiplier for multiplying first and second complex vectors to provide a complex product, comprising:
    a carry-save systolic array multiplier having a plurality of stages for receiving a multiplier and a multiplicand and outputting a sum and carry representing the product, wherein the multiplier consists of one of the real or imaginary parts of the first complex vector, and the multplicand consists of one of the real or imaginary parts of the second complex vector;
    feedback means for selectively feeding back the sum and carry output of said systolic array to a carry nd sum input on said systolic array;
    first register means for storing the first vector;
    second register means for storing the second vector;
    control means for controlling said first and second register and said feedback means to process one of the products in the real part of the complex product and one of the products in the imaginary part of the complex product in a first pass through said systolic array such that the two products are sequentially processed therethrough, said feedback means operable to feedback the sum and carries from the two products in the first pass to the sum and carry inputs of said systolic array for addition with the remaining product in the real part of the complex product and the remaining product in the imaginary part of the complex product to form the sum and carry for the complex product in a second pass through said systolic array,; and
    summing means for summing the sum and carry outputs of said systolic array after said second pass to form the complex product.

2. The multiplier of claim 1 wherein the s and carries of the products processed through the first or pass in said systolic array have a common multiplier or multiplicand.

3. The multiplier of claim 1 wherein said summing means comprises a fast adder.

4. An apparatus for performing arithmetical operations on first, second, and third complex vectors, comprising:
    a carry-save systolic array multiplier having a plurality of (n) stages for receiving a multiplier and a multiplicand and outputting a sum and carry representing the product, wherein the multiplier consists of the first complex vector, and the multiplicand consists of the second complex vector;
    feedback means for selectively feeding back the sum and carry output of said systolic array to a carry and sum input on said systolic array;
    first register means for storing the first vector;
    second register means for storing the second vector;
    control means for controlling said first and second register and said feedback means to process one of the products in the real part of the complex product and one of the products in the imaginary part of the complex product in a first pass through said systolic array such that the two products are sequentially processed therethrough, said feedback means operable to feedback the sum and carries from the two products in the first pass to the sum and carry inputs of said systolic array for addition with the remaining product in the real part of the complex product and the remaining product in the imaginary part of the complex product to form the sum and carry for the complex product in a second pass through said systolic array;
    summing means for summing the sum and carry outputs of said systolic array after said second pass to form the complex product, including first and second fast adders, said first adder configured for an addition operation and said second adder configured for a subtraction operation;
    third register means for storing input vectors for performing a complex addition and a complex subtraction with the complex product;
    said control means further controlling said third register means to input select ones of the real and imaginary parts of said input vectors in said third register means to said first and second fast adders in addition to the sum and carries output from said systolic array multiplier on the second pass therethrough such that and addition and subtraction operation is performed between the real part of the third input vector and the real part of the complex product and an addition and subtraction operation is performed between the imaginary part of the third input vector and the imaginary part of the complex product.

5. A complex multiplier for multiplying first and second complex vectors to provide a complex product, comprising:

a carry-save systolic array multiplier having a plurality of (n) stages for receiving a multiplier and a multiplicand and outputting a sum and carry representing the product, wherein the multiplier consists of the first complex vector, and the multiplicand consists of the second complex vector, said carry-save systolic array multiplier operating at a predetermined clock rate;

feedback means for selectively feeding back the sum and carry output of said systolic array to a carry and sum input on said systolic array;

delay means for delaying the feedback sum and carry from said feedback means by a preselected number (x) of clock cycles;

summing means for summing select ones of the sum and carry outputs of said systolic array to provide a product;

first register means for storing the first vector;

second register means for storing the second vector; and control means controlling said first and second registers in said feedback means to input multipliers and multiplicands to said systolic array multiplier for processing such that the sum and carry for one of the products in each of the real and imaginary parts of the complex product are first processed in said systolic array multiplier and spaced apart by one of the n stages to provide a first pass through said array multiplier in n clock cycles, said control means inputting the multipliers and multiplicands for the other of the products in the real and imaginary parts of the complex product to said systolic array multiplier and spaced apart by one of the n stages in addition to the fed back sum and carry for the respective one of the products after n+x clock cycles to provide a second pass through said systolic array multiplier to generate the sum and carry for the real and imaginary parts of the complex product, said summing means controlled to sum the sum and carry at the end of the second pass of each of the products to output the real and imaginary parts of the complex product;

said control means interlacing the first pass of the multipliers and multiplicands for one complex product with the second pass of the multipliers and multiplicands for a preceding complex product such that the sum and carry for the real or imaginary parts of a complex product are output for every clock cycle of said systolic array multiplier to allow said summing means to operate at one-half the clock rate of said systolic array multiplier with continuous flow of data through said systolic array multiplier.

6. The complex multiplier of claim 5 wherein said systolic array operates in accordance with a modified Booth's algorithm with the length of the multiplicand being equal to 2n.

7. The complex multiplier of claim 6 wherein said systolic array comprises:

an array of adders formed in rows and columns with each column corresponding to one bit of a multiplicand and each row corresponding to a partial product, each of said adders having associated therewith a sum register, a carry register and a data register on the input thereof for storage of processed sum and carrys and the associated multiplicand bit, respectively;

Booth operator means associated with each of said adders for determining the Booth operation to be performed on a multiplicand bit in accordance with a Booth operator control signal;

said adders receiving the input sum, carry and modified multiplicand bit to output a sum and carry, said output sum and carry shifted in accordance with the modified Booth's algorithm for input to the next row;

decode means for examining the bits of the multiplier associated with each row to determine the Booth operator necessary for forming the associated partial product and generating said Booth operator control signal for input to said Booth operator means; and delay means for delaying the bits of the multiplier associated with each of said rows such that the appropriate bits are present when the partial product is to be generated and summed with the intermediate partial product sum.

8. The complex multiplier of claim 5 wherein said summing means comprises a fast adder.

9. The complex multiplier of claim 5 wherein said delay means delays the fed back sum and carry from said feedback means by two clock cycles.

10. An apparatus for performing arithmetical operations on first, second, and third complex vectors, comprising:

a carry-save systolic array multiplier having a plurality of (n) stages for receiving a multiplier and a multiplicand and outputting a sum and carry representing the product, wherein the multiplier consist of the first complex vector, and the multiplicand consists of the second complex vector, said carry-save systolic array operating at a predetermined clock rate;

feedback means for selectively feeding back the sum and carry output of said systolic array to a carry and sum input on said systolic array;

delay means for delaying the feedback sum and carry from said feedback means by a preselected number (x) of clock cycles;

summing means for summing select ones of the sum and carry outputs of said systolic array to provide a product;

first register means for storing the first vector;

second register means for storing the second vector;

control means controlling said first and second registers in said feedback means to input multipliers and multiplicands to said systolic array multiplier for processing such that the sum and carry for one of the products in each of the real and imaginary parts of the complex product are first processed in said systolic array multiplier and spaced apart by one of the n stages to provide a first pass through said array multiplier in n clock cycles, said control means inputting the multipliers and multiplicands for the other of the products in the real and imaginary parts of the complex product to said systolic array multiplier and spaced apart by one of the n stages in addition to the fed back sum and carry for the respective one of the products after n+x clock cycles to provide a second pass through said systolic array multiplier to generate the sum and carry for the real and imaginary parts of the complex product, said summing means controlled to sum the sum and carry at the end of the second pass of each of the products to output the real and imaginary parts of the complex product;

said control means interlacing the first pass of the multipliers and multiplicands for one complex product with the second pass of the multipliers and multiplicands for a preceding complex product such that the sum and carry for the real or imaginary parts of a complex product are output for every clock cycle of said systolic array multiplier to allow said summing means to operate at one-half the clock rate of said systolic array multiplier with continuous flow of data through said systolic array multiplier;

third register means for storing the third input vector for complex addition and subtraction with the complex product;

said summing means comprising first and second fast adders, said first adder configured for addition and said second adder configured for subtraction, said first and second adders receiving only the real and imaginary parts of the complex product on the second pass through said systolic array multiplier, said control means controlling said third register means to output the real part of the input vector for addition and subtraction with the sum and carry for the real part of the complex product and the imaginary part of the input vector for addition and subtraction with the sum and carry for the imaginary part of the complex product; and storage means for storing the results of the complex addition and subtraction.

11. A method for multiplying two vectors to provide complex product, comprising:
  providing a carry-save systolic array multiplier having a number of stages (n) for receiving a multiplier and a multiplicand, wherein the multiplier consists of the first vector, and the multiplicand consists of the second vector, and outputting a sum and carry representing the product;
  sequentially processing one of the products for each of the imaginary and real parts of the complex product through the systolic array multiplier to sequentially output the sum and carries therefor to comprise a first pass through the systolic array multiplier;
  sequentially feeding back the sum and carries for the product in the first pass to a sum and carry input on the systolic array multiplier;
  sequentially processing the other of the products for each of the real and imaginary parts of the complex product with the sequentially fed back sum and carries to output the sum and carries for the complex product in a second pass through the systolic array multiplier; and
  summing the sum and carry for the complex product in the second pass to output the complex product.

12. The method of claim 11 and further comprising:
  delaying the second of the two products processed in the first pass of the systolic array by one stage;
  delaying the sum and carry fed back to the sum and carry inputs of the systolic array by two clock cycles of the systolic array, one clock cycle being the time to process sums and carries through one of the n stages of the systolic array; and
  interleaving products in a first pass of a subsequent complex product calculation with the second pass through the array of the present operation such that the sum and carries for complex product are output every other cycle of the systolic array, the step of summing operating at one half the clock rate of the systolic array.

13. A method for performing arithmetical operations on three vectors, comprising:
  providing a carry-save systolic array multiplier having a number of stages (n) for receiving a multiplier and a multiplicand, wherein the multiplier consists of the first vector, and the multiplicand consists of the second vector and outputting a sum and carry representing the product;
  sequentially processing one of the products for each of the imaginary and real parts of the complex product through the systolic array multiplier to sequentially output the sum and carries therefor to comprise a first pass through the systolic array multiplier;
  sequentially feeding back the sum and carries for the product in the first pass to a sum and carry input on the systolic array multiplier;
  sequentially processing the other of the products for each of the real and imaginary parts of the complex product with the sequentially fed back sum and carries to output the sum and carries for the complex product in a second pass through the systolic array multiplier;
  summing the sum and carry for the complex product in the second pass to output the complex product; and
  adding the real part of the third vector to the real part of the complex product and subtracting the real part of the complex product from the real part of the third and adding the imaginary part of the third vector to the imaginary part of the complex product and subtracting the imaginary part of the complex product from the imaginary part of the third to provide a complex addition and subtraction, the operations on the real part of the third vector and the imaginary part of the third vector coinciding with the summing of the sum and carries of the respective parts of the complex product.

* * * * *